United States Patent
Lindner et al.

(10) Patent No.: US 11,187,804 B2
(45) Date of Patent: Nov. 30, 2021

(54) TIME OF FLIGHT RANGE FINDER FOR A STRUCTURED LIGHT SYSTEM

(71) Applicant: QUALCOMM Incorporated, San Diego, CA (US)

(72) Inventors: Albrecht Johannes Lindner, La Jolla, CA (US); Htet Naing, San Diego, CA (US); Kalin Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 15/992,746

(22) Filed: May 30, 2018

(65) Prior Publication Data
US 2019/0369247 A1    Dec. 5, 2019

(51) Int. Cl.
*G01C 3/08* (2006.01)
*G01S 17/10* (2020.01)
*G01S 7/497* (2006.01)

(52) U.S. Cl.
CPC ........... *G01S 17/10* (2013.01); *G01S 7/497* (2013.01)

(58) Field of Classification Search
CPC ...... G01S 7/4816; G01S 7/486; G01S 7/4814; G01S 7/484; G01S 7/497; G01S 17/10; G01S 17/894
See application file for complete search history.

(56) References Cited

U.S. PATENT DOCUMENTS

| | | | |
|---|---|---|---|
| 8,970,827 B2 | 3/2015 | Bloom et al. | |
| 9,858,672 B2 | 1/2018 | Trail | |
| 2015/0062558 A1 | 3/2015 | Koppal et al. | |
| 2016/0005179 A1 | 1/2016 | Petyushko et al. | |
| 2017/0068319 A1* | 3/2017 | Viswanathan | G06T 7/521 |
| 2018/0054610 A1* | 2/2018 | Shpunt | G02B 26/0816 |
| 2018/0231372 A1* | 8/2018 | Trail | G01C 3/08 |
| 2019/0072771 A1* | 3/2019 | Hall | G01B 5/0014 |

FOREIGN PATENT DOCUMENTS

| | | |
|---|---|---|
| WO | WO-2015024871 A1 | 2/2015 |
| WO | WO-2017123452 A1 | 7/2017 |
| WO | WO-2018042801 A1 | 3/2018 |

OTHER PUBLICATIONS

International Search Report and Written Opinion—PCT/US2019/031311—ISA/EPO—dated Jul. 9, 2019.

* cited by examiner

*Primary Examiner* — Mark Hellner
(74) *Attorney, Agent, or Firm* — Qualcomm Incorporated

(57) ABSTRACT

Aspects of the present disclosure relate to systems and methods for determining one or more depths. An example system includes a time-of-flight receiver configured to sense pulses from reflections of light from a structured light transmitter. An example method includes sensing, by a time-of-flight receiver, pulses from reflections of light from a structured light transmitter.

30 Claims, 8 Drawing Sheets

TIME OF FLIGHT RANGE FINDER FOR A STRUCTURED LIGHT SYSTEM

TECHNICAL FIELD

This disclosure relates generally to systems and methods for depth finding, and specifically to a time-of-flight range finder for a structured light system.

BACKGROUND OF RELATED ART

A device may determine distances of its surroundings using different depth finding systems. In determining the depth, the device may generate a depth map illustrating or otherwise indicating the depths of objects from the device by emitting one or more wireless signals and measuring reflections of the wireless signals from the scene. Two types of depth finding systems include a time-of-flight (TOF) system and a structured light system.

For a TOF system, a pulsed light is emitted, and a reflection of the pulsed light is received. The round trip time of the light from the transmitter to the receiver is determined from the pulses, and the distance or depth from the TOF system of the object reflecting the emitted light is determined from the round trip time.

For a structured light system, a known spatial pattern of light is transmitted, and the reflections of the spatial pattern are received. The transmitter and receiver are separated by a distance, and displacement and distortion of the spatial pattern occurs at a receiver as a result. Triangulation with the displacement and distortion of the spatial pattern and the distance between the transmitter and receiver is used in determining a distance or depth from the structured light system of the object reflecting the emitted light.

The pattern strength of a structured light system may be limited, thus limiting the range of depth finding. Additionally, the distance between the transmitter and the receiver for triangulation corresponds to the accuracy of the depth measurements. A smaller distance causes depth measurements of objects to be less accurate, with the impact on accuracy increasing as the depth of the object from the structured light system increases.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for determining one or more depths. An example system includes a time-of-flight receiver configured to sense pulses from reflections of light from a structured light transmitter.

In another example, a method for determining one or more depths is disclosed. The method includes sensing, by a time-of-flight receiver, pulses from reflections of light from a structured light transmitter.

In a further example, a non-transitory computer-readable medium storing one or more programs containing instructions is disclosed. Executing the instructions by one or more processors of a device causes the device to sense, by a time-of-flight receiver, pulses from reflections of light from a structured light transmitter In another example, a device for determining one or more depths is disclosed. The device includes means for transmitting pulsed light in a spatial pattern, means for sensing reflections of the pulsed light in the spatial pattern, and means for sensing pulses from reflections of the pulsed light. The means for sensing pulses is separate from the means for sensing reflections of the light in the spatial pattern.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Aspects of the present disclosure may be used for depth finding systems. In some aspects, a TOF sensor may receive a portion of a structured light transmission to determine a depth of an object reflecting the portion of the structured light transmission. In this manner, ranging using TOF information may be performed outside the effective range of the structured light system.

Figure 1:
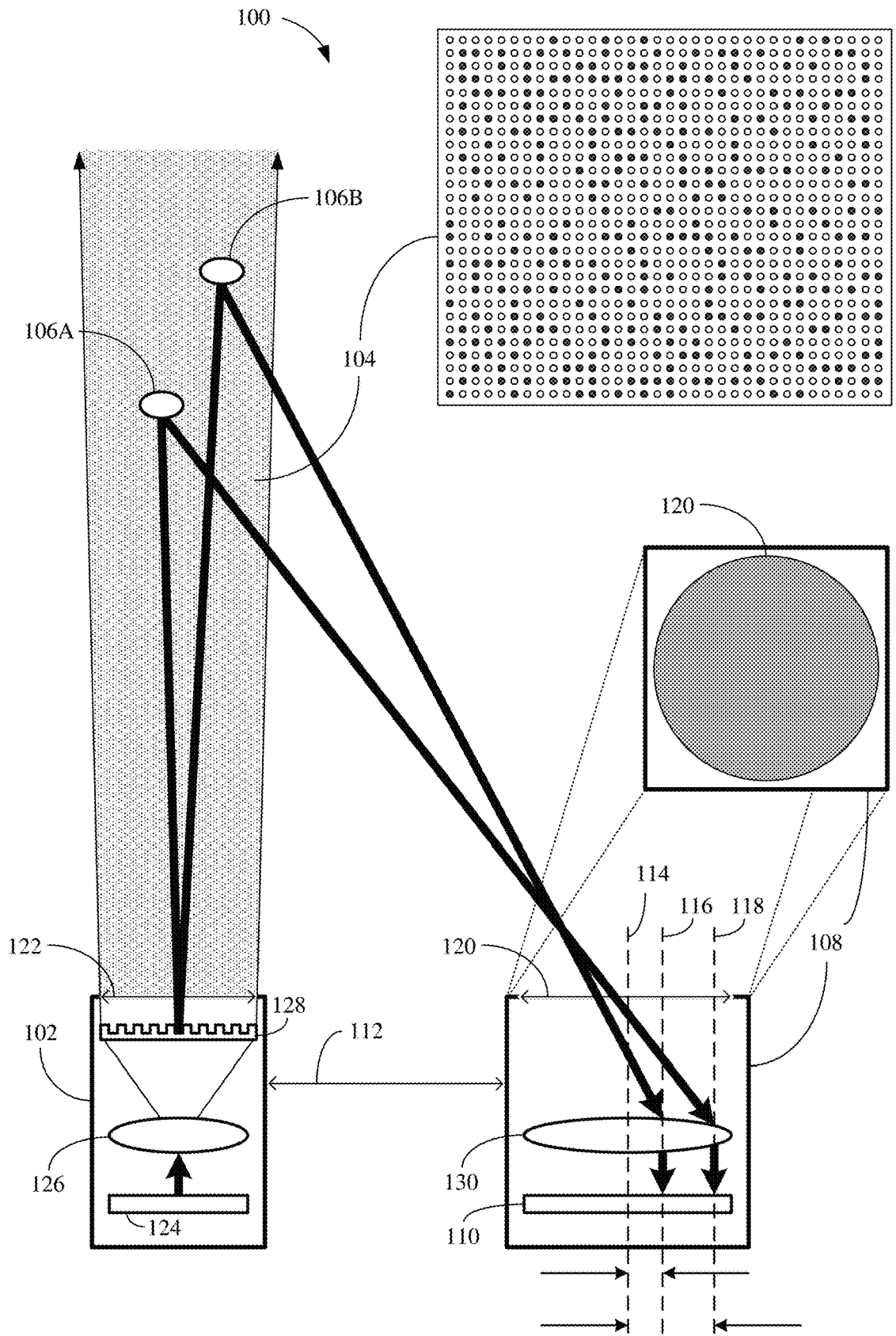
FIG. 1 is a depiction of a structured light system.

FIG. 1 is a depiction of a structured light system 100. The structured light system 100 may be used to generate a depth map (not pictured) of a scene (with objects 106A and 106B at different depths in the scene) or may be used for other applications for ranging of objects 106A and 106B or other portions of the scene. The structured light system 100 may include a transmitter 102 and a receiver 108.

The transmitter 102 may be configured to project a spatial pattern 104 onto the scene (including objects 106A and 106B). The transmitter 102 may include one or more light sources 124 (such as laser sources), a lens 126, and a light modulator 128. In some embodiments, the light modulator 128 includes one or more diffractive optical elements (DOEs) to diffract the emissions from one or more light sources 124 (which may be directed by the lens 126 to the light modulator 128) into additional emissions. The light modulator 128 may also adjust the intensity of the emissions. Additionally or alternatively, the lights sources 124 may be configured to adjust the intensity of the emissions.

In some other implementations of the transmitter 102, a DOE may be coupled directly to a light source (without lens 126) and be configured to diffuse the emitted light from the light source into at least a portion of the spatial pattern 104. The spatial pattern 104 may be a fixed pattern of emitted light that the transmitter projects onto a scene. For example, a DOE may be manufactured so that the black spots in the spatial pattern 104 correspond to locations in the DOE that prevent light from the light source 124 being emitted by the transmitter 102. In this manner, the spatial pattern 104 may be known in analyzing any reflections received by the receiver 108. The transmitter 102 may transmit the light in a spatial pattern through the aperture 122 of the transmitter 102 and onto the scene (including objects 106A and 106B).

The receiver 108 may include an aperture 120 through which reflections of the emitted light may pass, be directed by a lens 130 and hit a sensor 110. The sensor 110 may be configured to detect (or "sense"), from the scene, one or more reflections of the spatial patterned light. As illustrated, the transmitter 102 may be positioned on the same reference plane as the receiver 108, and the transmitter 102 and the receiver 108 may be separated by a distance 112 called the "baseline."

The sensor 110 may include an array of photodiodes (such as avalanche photodiodes) to measure or sense the reflections. The array may be coupled to a complementary metal-oxide semiconductor (CMOS) sensor including a number of pixels or regions corresponding to the number of photodiodes in the array. The plurality of electrical impulses generated by the array may trigger the corresponding pixels or regions of the CMOS sensor to provide measurements of the reflections sensed by the array. Alternatively, the sensor 110 may be a photosensitive CMOS sensor to sense or measure reflections including the reflected codeword pattern. The CMOS sensor logically may be divided into groups of pixels that correspond to a size of a bit or a size of a codeword (a patch of bits) of the spatial pattern 104.

The reflections may include multiple reflections of the spatial patterned light from different objects or portions of the scene at different depths (such as objects 106A and 106B). Based on the baseline 112, displacement and distortion of the sensed light in spatial pattern 104, and intensities of the reflections, the structured light system 100 may be used to determine one or more depths and locations of objects (such as objects 106A and 106B) from the structured light system 100. With triangulation based on the baseline and the distances, the structured light system 100 may be used to determine the differing distances between objects 106A and 106B. For example, a first distance between the center 114 and the location 116 where the light reflected from the object 106B hits the sensor 110 is less than a second distance between the center 114 and the location 118 where the light reflected from the object 106A hits the sensor 110. The distances from the center to the location 116 and the location 118 of the sensor 110 may indicate the depth of the objects 106A and 106B, respectively. The first distance being less than the second distance may indicate that the object 106B is further from the transmitter 102 than object 106A. In addition to determining a distance from the center of the sensor 110, the calculations may further include determining a displacement or distortion of the spatial pattern 104 in the light hitting the sensor 110 to determine depths or distances.

A structured light system included in a power constrained device (such as a smartphone, tablet, or other battery operated device) have limitations on the transmit intensity for the spatial patterned light (which corresponds to the power provided to the light sources for transmitting the light). Further, eye safety concerns may motivate a structured light system manufacturer or device manufacturer to limit the light intensity of the transmitter. As a result, the effective range of the structured light system may be constrained. For example, a structured light system of a smartphone may have an effective range of up to four meters, with the depth of objects further from the smartphone than four meters not consistently determined.

For the structured light system, the overall power for transmitting the spatial patterned light is for a plurality of light points in the spatial pattern. If the overall power is dedicated to one light source, the intensity of the light from the one light source would be greater than the intensity of each light point in the spatial pattern. Assuming the field of the light from the one light source and the field of the light from each light point in the spatial pattern is the same, the light from the one light source may travel further than each light point in the spatial pattern. In this manner, TOF ranging using the one light source may have a larger effective range than determining depths using the structured light system. Further, since a structured light system identifies codewords in the reflections, the accuracy of a structured light system may decrease as the depth of an object increases until the structured light system can no longer reliably measure a depth (which may be considered the upper limit of the effective range). In contrast, the accuracy of measurements by a TOF system does not decrease as the distance increases as long as the TOF system is able to recognize the reflections.

Another advantage of a TOF system is that the system is less sensitive to component movements during operation. For example, when a user holds a smartphone (such as by the bezel), a pressure or squeezing of the smartphone by the user's hand may occur to maintain grip of the smartphone. The pressure from squeezing the smartphone to maintain grip may cause the smartphone to slightly bend and the internal components of the smartphone to slightly move. As a result, the light sources of the transmitter may move and therefore distort the spatial pattern. The distorted spatial pattern may negatively impact depth measurements. In contrast, a TOF system, which measures a round trip time, is not impacted by such pressure or forces applied. For example, a TOF system in a smartphone is not affected by a user maintaining grip on the smartphone by applying pressure which may slightly bend the smartphone.

Figure 2:
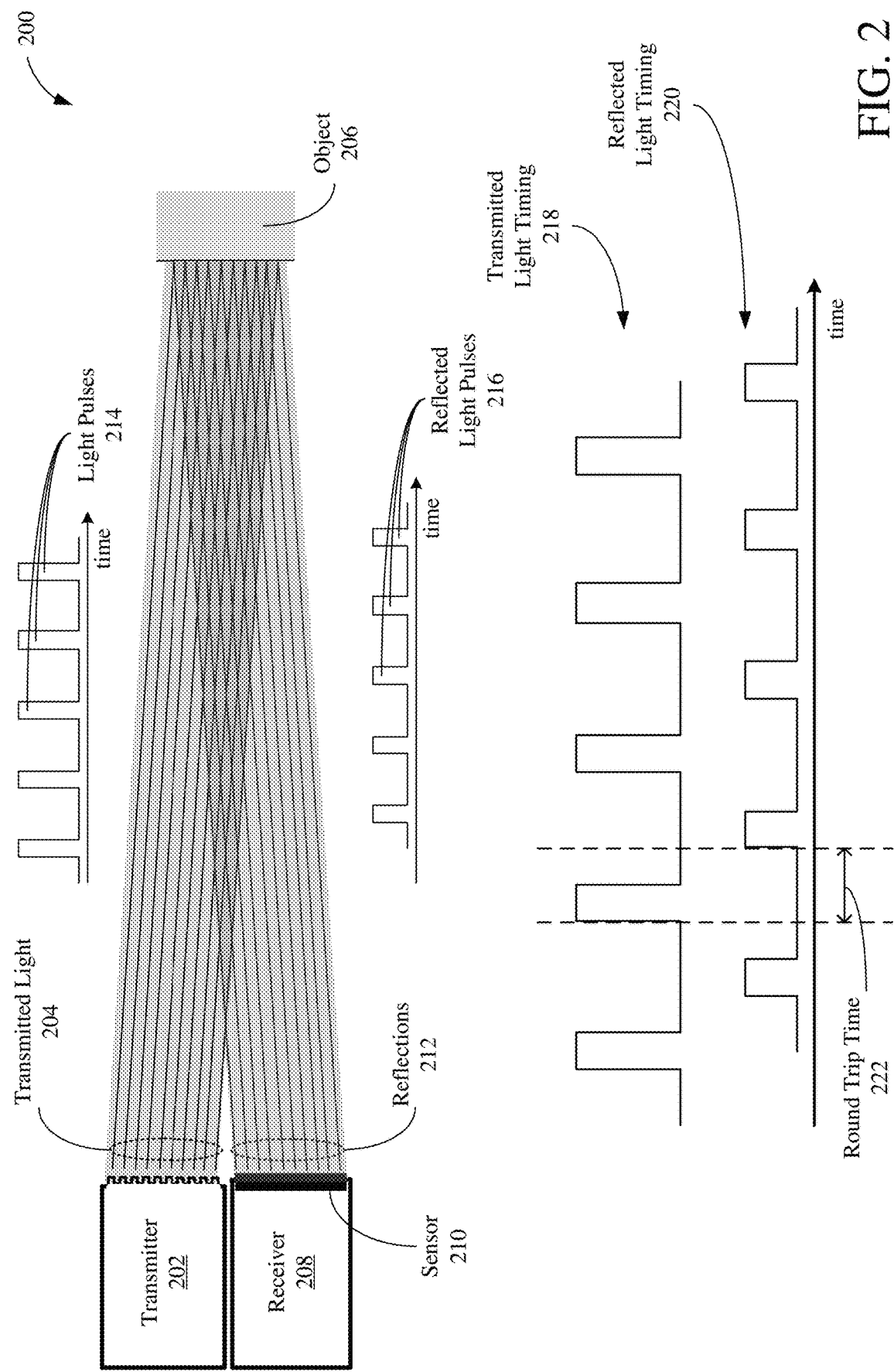
FIG. 2 is a depiction of a TOF system.

FIG. 2 is a depiction of a TOF system 200. The TOF system 200 may be used to generate a depth map (not pictured) of a scene (including object 206 in the scene illustrated as reflecting light from the transmitter 202) or may be used for other applications for ranging. The TOF system 200 may include a transmitter 202 and a receiver 208. The transmitter 202 may be referred to as a "transmitter," "projector," "emitter," and so on, and should not be limited to a specific transmission component. Similarly, the receiver 208 may be referred to as a "detector," "sensor," "sensing element," "photodetector," and so on, and should not be limited to a specific receiving component.

The transmitter 202 may be configured to transmit, emit, or project signals (such as a field of light) onto the scene (including onto the object 206). The transmitter 202 transmits light 204 toward a scene. While the transmitted light 204 is illustrated only as being directed to the object 206, the field of the emission or transmission by the transmitter 202 may extend beyond the object 206 (such as toward the entire scene including the object 206). For example, a conventional TOF system transmitter has a fixed focal length lens for the emission that defines the field of the emission traveling away from the transmitter.

The transmitted light 204 includes light pulses 214 at known time intervals (such as periodically). The receiver 208 includes a sensor 210 to sense the reflections 212 of the transmitted light 204. The reflections 212 include the reflected light pulses 216, and the TOF system determines a round trip time 222 for the light by comparing the timing 218 of the transmitted light pulses to the timing 220 of the reflected light pulses. The distance of the object 206 from the TOF system may be calculated to be half the round trip time multiplied by the speed of the emissions (such as the speed of light for light emissions).

The sensor 210 may include an array of photodiodes to measure or sense the reflections. Alternatively, the sensor 210 may include a CMOS sensor or other suitable photosensitive sensor including a number of pixels or regions for sensing. The TOF system 200 identifies the reflected light pulses 216 as sensed by the sensor 210 when the magnitude of the pulses is greater than a threshold. For example, the TOF system measures a magnitude of the ambient light and other interference without the signal, and then determines if further measurements are greater than the previous measurement by a threshold. The upper limit of the effective range of a TOF system may be the distance where the noise or the degradation of the signal, before sensing the reflections, cause the signal-to-noise ratio (SNR) to be too great for the sensor to accurately sense the reflected light pulses 216. To reduce interference, the receiver 208 may include a bandpass filter before the sensor 210 to filter some of the incoming light at different wavelengths than the transmitted light 204.

The resolution (number of distances that may be determined concurrently) for a TOF system may be lower than for a structured light system. With objects in a scene being at different depths, reflections of transmitted light may be received at difference instances of time. A structured light system is not dependent on a round trip time and therefore is not affected by receiving reflections at multiple time instances. For a TOF system, the reflections at different time instances may cause interference in attempting to determine a round trip time. To reduce interference, many TOF systems may focus one beam of pulsed light and use the receiver to determine one round trip time for the pulsed light. To compensate for using one beam of light, the speed of a TOF system may be increased to more quickly determine round trip time for different points in sequence, but limitations may exist in the spacing of the pulses for the transmitted light. As a result, while a TOF system may be effective at longer distances than structure light systems and not be affected by component movement (which may cause spatial pattern distortion for a structured light system), many TOF systems may have a lower resolution than structured lights systems.

Since a TOF system may have a lower resolution but a higher effective range than a structured light system, a TOF system may be used for ranging or determining a depth of an object further from the system than can be determined using a structured light system. For example, a TOF system may be used for range finding applications. Conversely, a structured light system may be used for object recognition or applications requiring more points of depth than can be provided by a TOF system. For example, a structured light system may be used for facial recognition and identification. Further, if both systems exist for a device, a TOF system may be used to calibrate a structured light system or determine if the depths determined using a structured light system are erroneous.

A device may include both a TOF system and a structured light system. However, two transmitters and other components may be required. As a result, two systems may consume more power and more space than preferred in the device. Alternatively, a structured light receiver sensor may be configured to sense pulses to determine a round trip time. However, with the receiver being separated from the transmitter by the baseline, the calculation of a depth from a measured round trip time is complicated by triangulation calculations. Further, the structured light sensor would need to be configured to identify pulses and identify codewords of the spatial pattern in the reflections, which may cause significant complexities in designing and manufacturing the structured light receiver.

For example, the structured light system may operate in the near-infrared (NIR) range, and the wavelength of the light from the structured light transmitter may be 825 nanometers (nm) or 940 nm (although other frequency ranges and wavelengths may be used). A conventional structured light receiver sensor (which may be similar to a camera sensor) may have a frame rate of 30 frames per second (fps), and an exposure length of approximately 33 ms to capture the light intensity for the spatial pattern. With the speed of light at approximately 300 million meters per second, a wavelength of 825 nm, and an exposure window of 33 ms, a large number of periods of the light occur during the exposure window of the structured light sensor. The conventional structured light sensor, with the conventional frame rates, is unable to differentiate between periods of the transmitted light.

If the transmitted light is pulsed (other than the natural waveform for the light signal) for a conventional structured light sensor to be able sense the pulses, the exposure length of a structured light sensor (such as 33 ms) requires the rate of pulsing be slower than the exposure length. As a result, the number of round trip times that may be determined over a period of time is limited by the exposure length of the sensor. TOF sensors (which may include an avalanche photodiode) may have a shorter exposure length than a structured light sensor. For example, the exposure length for an avalanche photodiode may be 10 picoseconds (as compared to 33 ms for an example structured light system). Therefore, pulses for a TOF sensor may be closer together than for a structured light sensor being used for determining a round trip time. If the pulses are slowed so that a structured light sensor may be used to determine a round trip time, the number of round trip times that may be determined using an example structured light system with an exposure length of 33 ms is a small fraction of the number of round trip times that may be determined using an example TOS system with an exposure length of 10 picoseconds (such as up to a theoretical limit of 3 billion pulses for a TOF system per 1 pulse for a structured light system).

In some example implementations, a TOF sensor separate from the structured light sensor may be used to identify pulses of the transmitted light in at least a portion of the spatial pattern. The structured light receiver may be a conventional structured light receiver. A conventional spatial pattern may also be used, thus not requiring changes to the structured light transmitter. In this manner, the additional components from a conventional structured light system may be only the TOF sensor. In some example implementations, the TOF sensor may be a pulsed-light sensor. For example, the sensor may be one photodiode (such as an avalanche photodiode), and the photodiode may be collocated with the structured light transmitter (similar to the location of a receiver respective to a transmitter in conventional TOF systems). An avalanche photodiode may have a high time-of-arrival resolution as compared to a conventional structured light sensor (such as having a frame rate of 30 fps). For example, the time-of-arrival resolution for capturing photons by the avalanche photodiode may be less than 10 picoseconds. While the TOF sensor is described in the following examples as one photodiode, any number of photodiodes may be used (such as an array or line of photodiodes). Additionally or alternatively, the TOF sensor may be other configurations (such as a continuous wave sensor), and the present disclosure should not be limited to the provided examples.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits, systems, and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example systems and devices may include components other than those shown, including well-known components such as a processor, memory and the like.

Aspects of the present disclosure are applicable to TOF ranging for a structured light system, and may be included in or coupled to any suitable electronic device or system (such as security systems, smartphones, tablets, laptop computers, digital cameras, vehicles, drones, virtual reality devices, or other devices that may utilize depth sensing). While described below with respect to a device having or coupled to one structured light system, aspects of the present disclosure are applicable to devices having any number of structured light systems.

The term "device" is not limited to one or a specific number of physical objects (such as one smartphone, one controller, one processing system and so on). As used herein, a device may be any electronic device with one or more parts that may implement at least some portion of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, have one or more housings, be one or more objects integrated into another device, and may have movable or static components. While the below description and examples use the term "system" to describe various aspects of this disclosure, the term "system" is not limited to a specific configuration, type, or number of objects.

Figure 3:
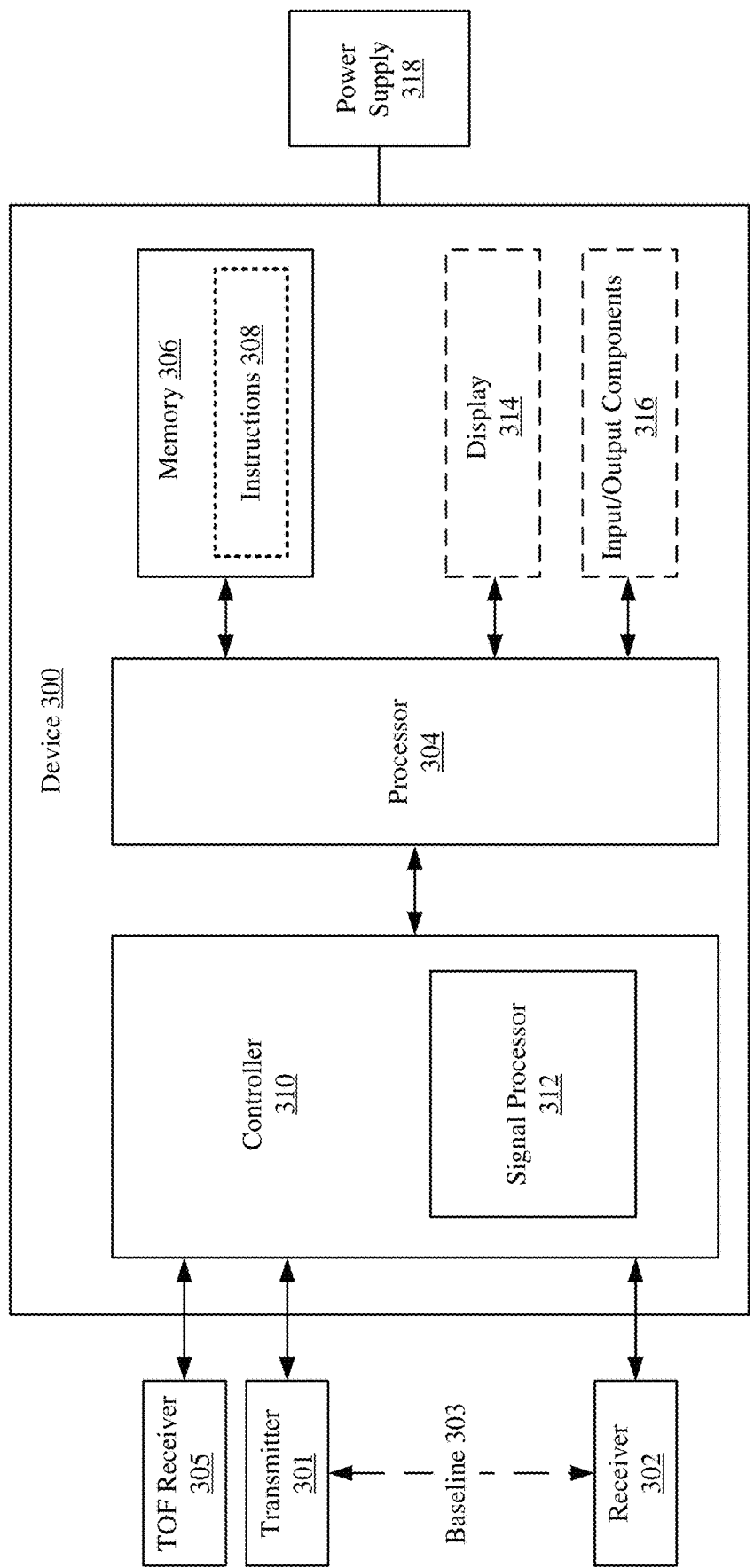
FIG. 3 is a block diagram of an example device including a structured light system.

FIG. 3 is a block diagram of an example device 300 including a structured light system. In some other examples, the structured light system may be coupled to the device 300. The example device 300 may include or be coupled to a transmitter 301 (such as transmitter 102 in FIG. 1), a receiver 302 (such as receiver 108 in FIG. 1) separated from the transmitter by a baseline 303, a TOF receiver 305, a processor 304, a memory 306 storing instructions 308, and a controller 310 (which may include one or more signal processors 312). The device 300 may optionally include (or be coupled to) a display 314 and a number of input/output (I/O) components 316. The device 300 may include additional features or components not shown. For example, a wireless interface, which may include a number of transceivers and a baseband processor, may be included for a wireless communication device. The device 300 may also include a power supply 318, which may be coupled to or integrated into the device 300.

The transmitter 301 and the receiver 302 may be part of a structured light system (such as structured light system 100 in FIG. 1) controlled by the controller 310 (such as signal processor 312) and/or the processor 304. The device 300 may include or be coupled to additional structured light systems, or a different configuration for the structured light system. The disclosure should not be limited to any specific examples or illustrations, including the example device 300.

The memory 306 may be a non-transient or non-transitory computer readable medium storing computer-executable instructions 308 to perform all or a portion of one or more operations described in this disclosure. The processor 304 may be one or more suitable processors capable of executing scripts or instructions of one or more software programs (such as instructions 308) stored within the memory 306. In some aspects, the processor 304 may be one or more general purpose processors that execute instructions 308 to cause the device 300 to perform any number of functions or operations. In additional or alternative aspects, the processor 304 may include integrated circuits or other hardware to perform functions or operations without the use of software. While shown to be coupled to each other via the processor 304 in the example of FIG. 3, the processor 304, the memory 306, the controller 310, the optional display 314, and the optional I/O components 316 may be coupled to one another in various arrangements. For example, the processor 304, the memory 306, the controller 310, the optional display 314, and the optional I/O components 316 may be coupled to each other via one or more local buses (not shown for simplicity).

The display 314 may be any suitable display or screen allowing for user interaction and/or to present items (such as a depth map or a preview image of the scene) for viewing by a user. In some aspects, the display 314 may be a touch-sensitive display. The I/O components 316 may be or include any suitable mechanism, interface, or device to receive input (such as commands) from the user and to provide output to the user. For example, the I/O components 316 may include (but are not limited to) a graphical user interface, keyboard, mouse, microphone and speakers, squeezable bezel or border of the device 300, physical buttons located on device 300, and so on. The display 314 and/or the I/O components 316 may provide a preview image or depth map of the scene to a user and/or receive a user input for adjusting one or more settings of the device 300 (such as controlling when to use the structured light system or when to perform TOF ranging, controlling pulsing the spatial patterned light, and so on).

The controller 310 may include a signal processor 312, which may be one or more processors to process measurements provided by the receiver 302 and the TOF receiver 305, and/or control the transmitter 301. In some aspects, the signal processor 312 may execute instructions from a memory (such as instructions 308 from the memory 306 or instructions stored in a separate memory coupled to the signal processor 312). In other aspects, the signal processor 312 may include specific hardware for operation. The signal processor 312 may alternatively or additionally include a combination of specific hardware and the ability to execute software instructions.

The transmitter 301 may emit spatial patterned light with at least a portion of the spatial patterned light including pulses for TOF ranging. In some example implementations, the transmitter 301 may include or be coupled to one or more power sources for adjusting the power to cause pulses in the spatial patterned light. For example, the transmitter 301 may include a plurality of lasers coupled to a plurality of DOEs for transmitting the spatial patterned light. The lasers may be coupled to one or more power sources (e.g., each laser may be coupled to a separate power source). One or more of the power sources may increase and decrease the power to one or more lasers so that at least a portion of the spatial patterned light includes pulses for TOF ranging. In some example implementations, the one or more power sources are configured to vary the power to one or more light sources (such as lasers) in a mode for TOF ranging, and to maintain a constant power to the one or more light sources (such as lasers) in a mode for structured light depth sensing. In some other example implementations, the one or more power sources are configured to always vary the power to one or more light sources.

The TOF receiver 305 may be collocated to the transmitter 301 and configured to sense reflections of at least a portion of the spatial patterned light from the transmitter 301. The reflections may then be used to identify pulses and determine a round trip time of the spatial patterned light (such as be controller 310 or signal processor 312). In some example implementations, the TOF receiver 305 is or includes one photodiode (such as an avalanche photodiode). In some other example implementations, the TOF receiver 305 is an array of photodiodes. The field of view of a photodiode or array of photodiodes may be narrowed (such as by an aperture or other funnel) so that the TOF receiver 305 is configured to sense pulses of a specific portion of the spatial patterned light. In some example implementations, the TOF receiver 305 may include a lens or multiple lenses to focus the light from a specific portion of the spatial patterned light onto the TOF sensor (such as to a photodiode or an array of photodiodes). If the TOF receiver 305 includes one photodiode, a depth measurement of one point of the scene may be performed using TOF ranging.

In some example implementations, the portion of the spatial patterned light corresponding to the TOF receiver 305 may be light from a zero order portion of the spatial pattern. For example, one or more DOEs may diffuse the light from one or more light sources to generate the spatial pattern. The zero order portion of the spatial pattern may be a portion where the DOE does not diffuse light from the light sources. In one example, the zero order portion may be a point of light from a DOE where the light is not bent from the source laser. In another example, the zero order portion may be a gap between DOEs (e.g., existing from conventional defects in manufacturing a structured light transmitter) where light from the laser sources escapes.

Figure 4:
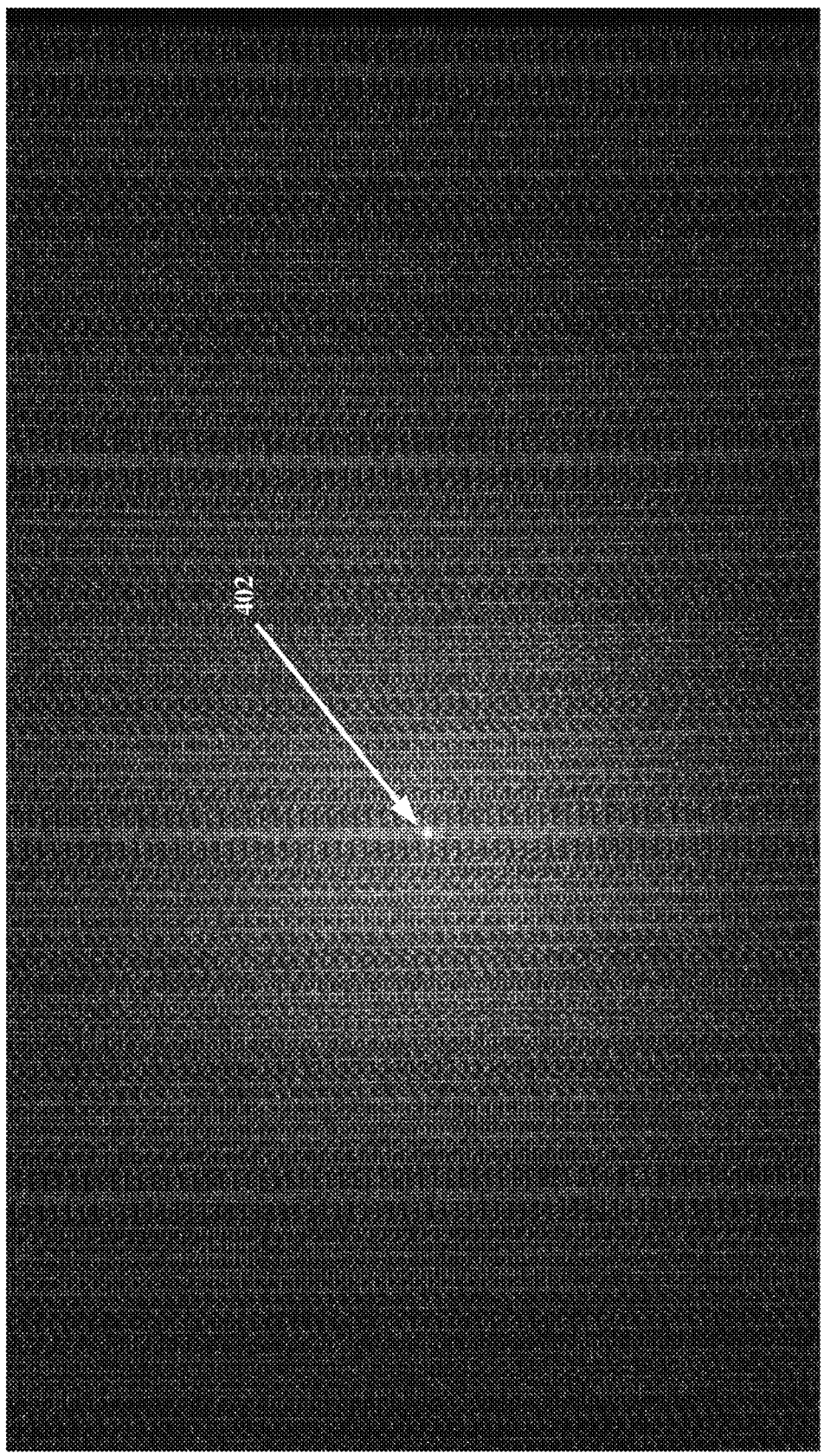
FIG. 4 is a depiction of the spatial patterned light as sensed by a structural light sensor.

FIG. 4 is a depiction of the spatial patterned light 400 as sensed by a structured light sensor. As shown, a point 402 of the spatial pattern 400 may have a higher intensity than the remainder of the spatial pattern 400. In some example implementations, the TOF receiver 305 may be configured to sense light pulses at point 402 of the spatial pattern 400. A portion of the spatial pattern including point 402 may have the light pulsed for TOF ranging. Alternatively, the light of the entire spatial pattern may be pulsed. In some example implementations, a TOF receiver lens may focus the reflected light from the zero order portion of the spatial pattern (which may be point 402) onto one or more photodiodes, and the one or more photodiodes may sense the light pulses from the zero order portion of the spatial pattern.

The pulses may be frequent enough to not impact operation of the structured light receiver. For example, if the exposure length of the structured light sensor is 33 ms, multiple light pulses (such as tens or hundreds of light pulses) may occur during the exposure length. Each pixel of the structured light sensor measures the accumulated intensity of the light over the exposure window and therefore may not be impacted by the pulses.

Figure 5:
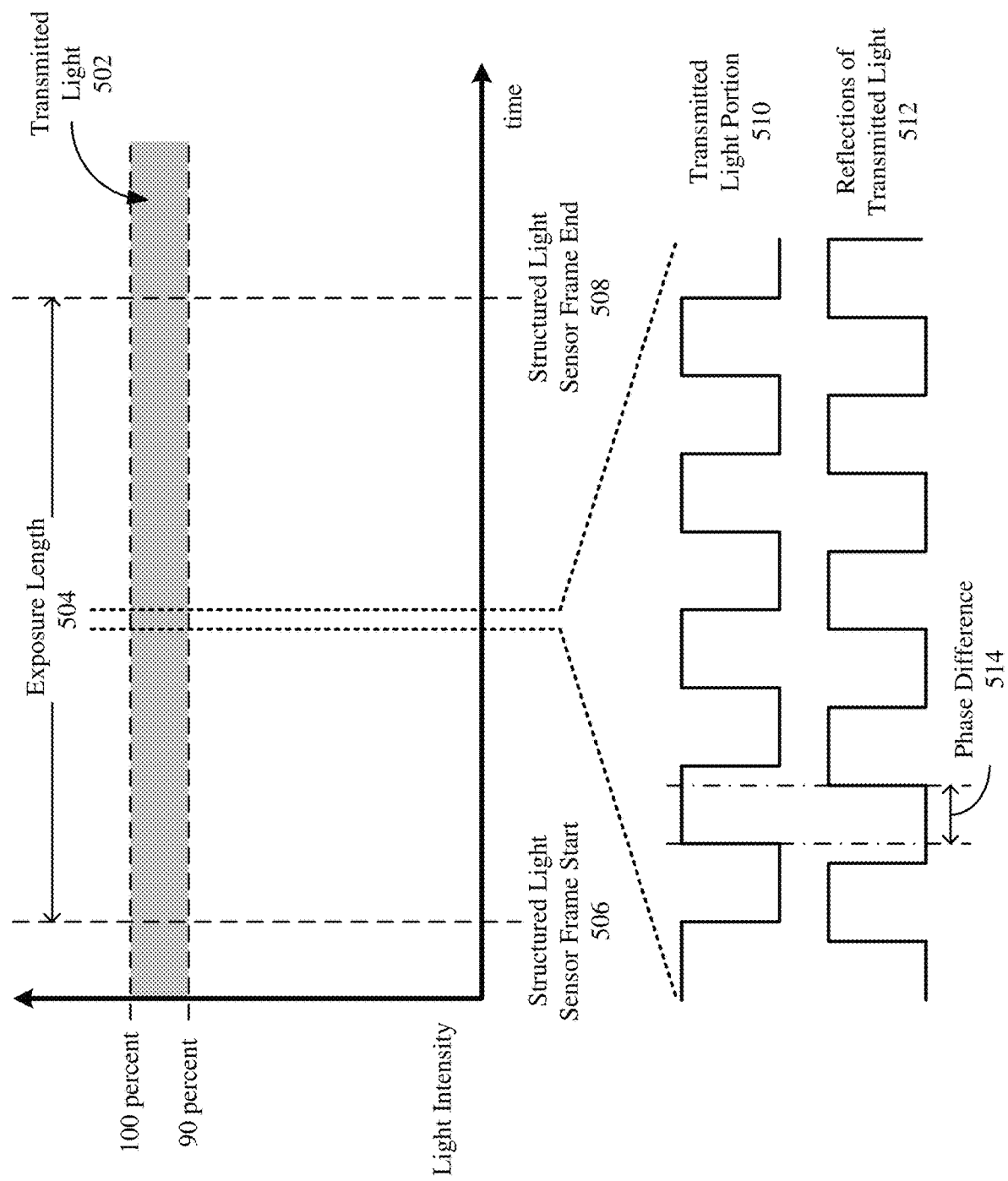
FIG. 5 is a depiction of the pulses of at least a portion of the spatial patterned light to be sensed by a TOF receiver.

FIG. 5 is a depiction of the pulses of at least a portion of the spatial patterned light to be sensed by the TOF receiver 305. Intensity of reflections of the transmitted light 502 may be sensed by a structured light receiver 302 of FIG. 3 during a frame with an exposure length 504 corresponding to the frame start 506 and the frame end 508. In some examples, the intensity of the light may vary from 90 percent to 100 percent of light intensity for pulsing. Any suitable intensity range for pulsing may be used, and the present disclosure should not be limited to a specific range or levels of light intensity for pulsing.

The example portion 510 of the transmitted light 502 depicts the plurality of pulses that occur during the exposure window of the frame for the structured light receiver. The reflections of transmitted light 512 depict the pulses as sensed by the TOF receiver 305 of FIG. 3. The phase difference 514 between the transmitted light 502 (as depicted by the portion 510) and the reflections 512 corresponds to the round trip time from the transmitter 301 of FIG. 3 and the TOF receiver 305 of FIG. 3. In some example implementations, the device 300 (such as controller 310, signal processor 312, or processor 304) of FIG. 3 determines the phase difference 514 and determines the round trip time based on the phase difference. The depth of an object from the device 300 and corresponding to the reflections 512 may be approximately half the round trip time multiplied by the speed of the transmitted signal (such as the speed of light for transmitted light).

Figure 6:
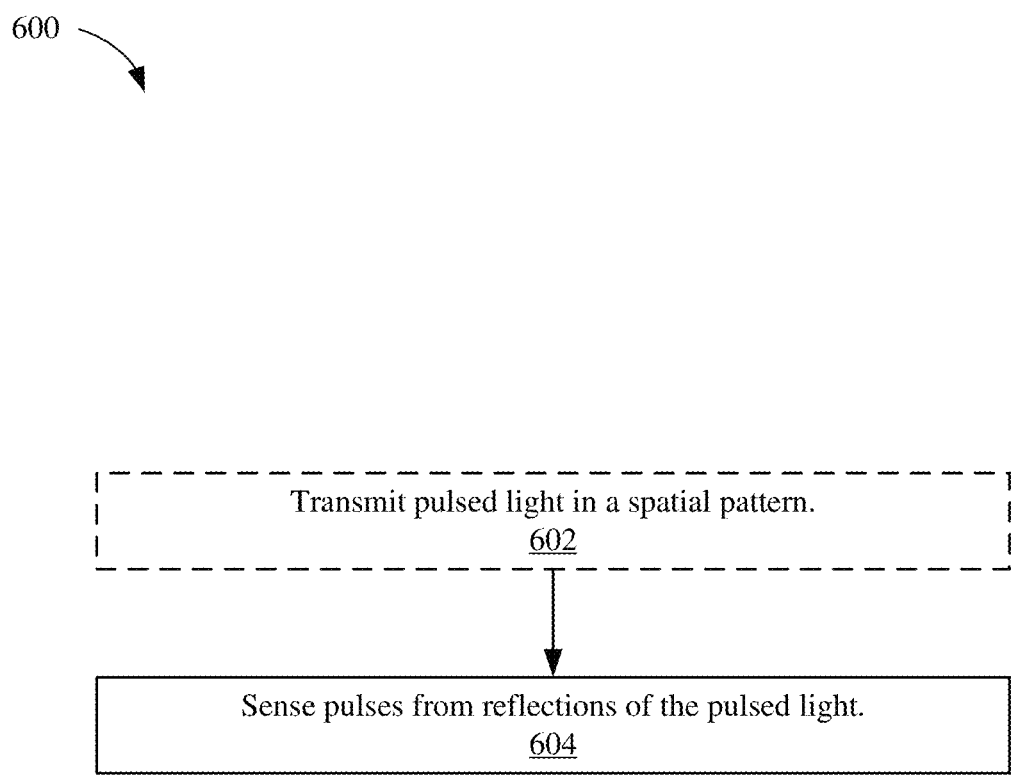
FIG. 6 is a flow chart depicting an example operation of TOF ranging for structured light transmissions.

FIG. 6 is a flow chart depicting an example operation 600 of TOF ranging for structured light transmissions. While the following example operations (including example operation 600) are described as being performed by example device 300 in FIG. 3, other devices or systems may be used for performing the example operations, and the present disclosure should not be limited to the provided examples.

Beginning at 602, a structured light transmitter 301 of FIG. 3 may transmit pulsed light in a spatial pattern. Alternatively, pulsed light in a spatial pattern may be transmitted by a transmitter separate from the system performing TOF ranging. Some implementations of the present disclosure do not require a structured light transmitter. A TOF transmitter 305 of FIG. 3 may then sense the pulses from reflections of the pulsed light from the structured light transmitter (604). For example, a portion of the pulsed light may reflect off an object of the scene and travel to the TOF receiver 305, and the TOF receiver 305 may sense the pulses from such reflection.

Figure 7:
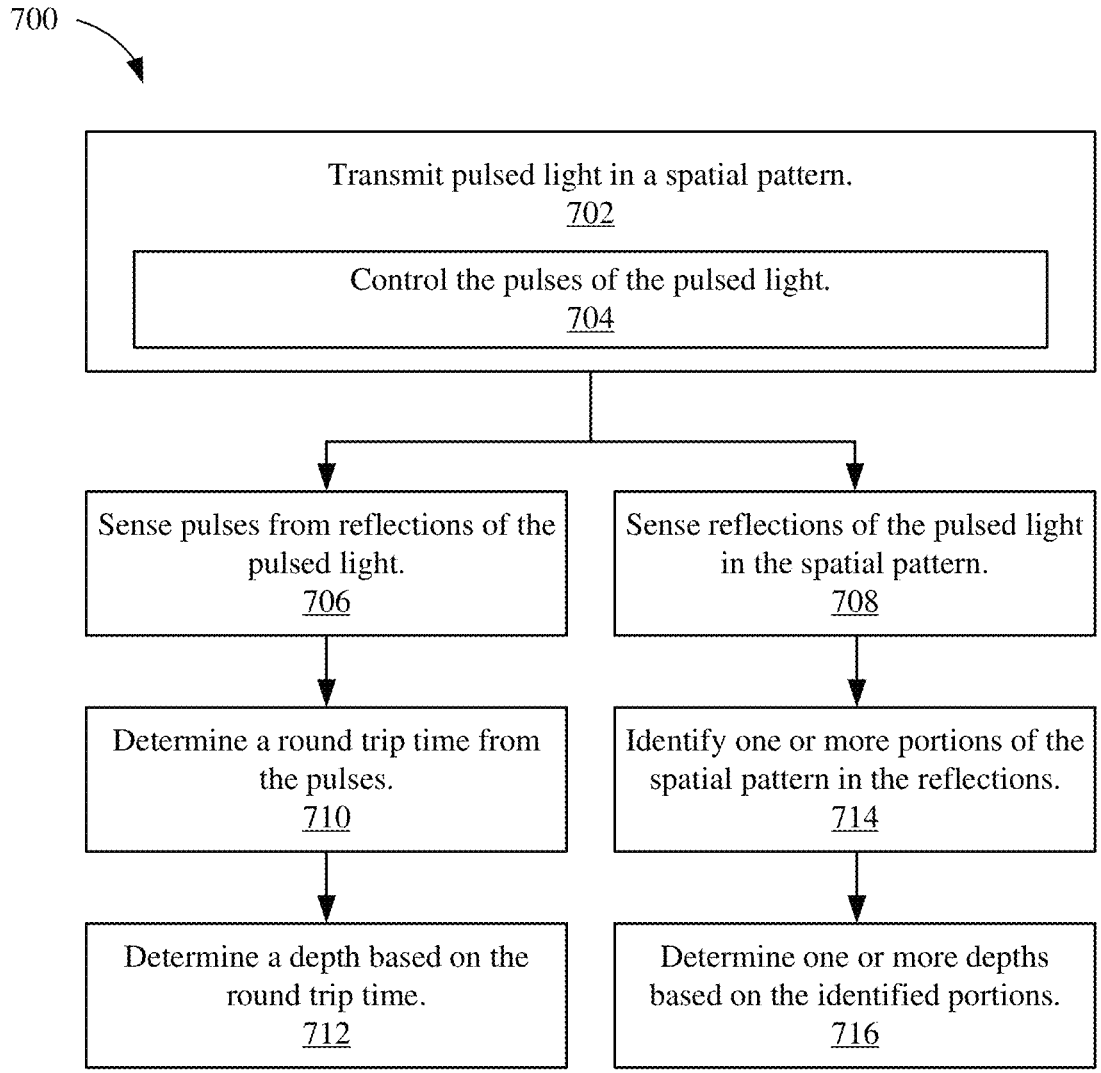
FIG. 7 is a flow chart depicting another example operation of TOF ranging for structured light transmissions.

FIG. 7 is a flow chart depicting an example operation 700 of TOF ranging for structured light transmissions. Beginning at 702, the structured light transmitter 301 of FIG. 3 may transmit pulsed light in a spatial pattern. In some example implementations, the power or current to one or more lasers of the transmitter 301 may vary to vary the light intensity from one or more lasers. The device 300 (such as controller 310) of FIG. 3 may control the pulses of the pulsed light from the transmitter 301 to prevent the structured light receiver 302 of FIG. 3 from sensing the pulses (704). In some example implementations, the device 300 may control the pulses so that a plurality of pulses occurs during the exposure window for each frame captured by the structured light receiver 302. As a result, the structured light receiver 302 does not sense individual pulses. Increased frequency of the pulses may provide increased accuracy and/or increased points in measuring the depth of an object based on round trip time.

The TOF receiver 305 of FIG. 3 may sense the pulses from reflections of the pulsed light from the transmitter 301 (706). In some example implementations, a photodiode may be configured to sense instances of when pulses occur in the zero order portion of the spatial pattern. Additionally, the structured light receiver 302 may sense reflections of the pulsed light in the spatial pattern (708). As previously stated, the exposure window for the structured light receiver 302 may be sufficiently long that the structured light receiver 302 does not sense the pulses in the reflections.

Referring back to step 706 regarding sensing the pulses, the controller 310 may determine a round trip time of the light (710). In some example implementations, the controller 310 may compare the time of transmission of the pulses from the transmitter 301 and the time of reception or sensing of the pulses by the TOF receiver 305 to determine a round trip time. In some other example implementations, the controller 310 may determine a phase difference between the transmission signal and the signal of the sensed pulses and determine a round trip time from the phase difference. The controller 310 may then determine a depth of an object based on the round trip time (712). For example, the depth may be half the round trip time multiplied by the speed of light.

Referring back to step 708 regarding sensing the light in the spatial pattern, the controller 310 may identify one or more portions of the spatial pattern in the sensed reflections (714). In some example implementations, the spatial pattern includes a plurality of codewords, and the controller 310 may identify one or more of the codewords in the sensed reflections. Then, the controller 310 may determine one or more depths of the scene based on the identified portions of the spatial pattern (716). For example, based on a distortion of an identified codeword and/or location on the sensor sensing the identified codeword, the controller 310 may determine a depth of an object. Each identified codeword may correspond to one determined depth of the scene. In this manner, the device 300 may determine a depth using TOF ranging and may determine a depth using structured light depth sensing from a structured light transmission. While the example operation 700 depicts concurrent TOF ranging and structured light depth finding, the operations may be performed sequentially. Alternatively, only one of the processes for determining a depth may be used.

In some example implementations, TOF ranging for the structured light transmissions may have a higher effective range than the structured light depth finding. For example, for a smartphone including an example structured light system with TOF ranging, TOF ranging may be effective up to 10 meters while structured light depth finding may be effective up to 4 meters. The device 300 may determine whether to determine a depth of an object using TOF ranging or using structured light. The device 300 may perform structured light depth finding in a first mode corresponding to a first range of depths from the device 300 (e.g., up to 4 meters from the device 300), and the device 300 may perform TOF ranging in a second mode corresponding to a range higher than the first range (e.g., greater than 4 meters from the device 300).

In some example implementations, if the device 300 in the second mode determines from TOF ranging that an object is within the first range of depths, the device 300 may switch modes to use structured light for depth finding (such as to be able to determine more points of depth than if using a TOF system). Additionally or alternatively, if the device 300 in the first mode determines that the object is outside the first range of depths or that the errors in identifying one or more portions of the spatial pattern is greater than a threshold (e.g., the device 300 is unable to accurately determine a distance using structured light), the device 300 may switch to the second mode to use TOF ranging.

While a device 300 may determine whether to use TOF ranging or structured light depth finding based on, e.g., the depth of an object, both the TOF receiver and the structured light receiver may be operational. In some example implementations, the device 300 may determine depths using both TOF ranging and structured light depth finding. The device 300 may then determine which depth to use. In some other example implementations, the device 300 may disregard measurements from one receiver based on whether to determine the depth using TOF ranging or structured light depth finding. In some further example implementations, the TOF receiver may be enabled when performing TOF ranging, and the structured light receiver may be enabled when performing structured light depth finding.

For a device with a structured light system (such as device 300 of FIG. 3), the spatial pattern may be deformed by movement of components in the transmitter (such as transmitter 301). For example, a user may squeeze a smartphone when gripping the smartphone (so as to maintain a grip) so that the spatial pattern from the structured light transmitter is distorted. The distortion in the spatial pattern at transmission may cause errors or inaccuracies in determining one or more depths from reflections of the spatial pattern. In some example implementations, a device may use TOF ranging to calibrate a structured light receiver (such as the receiver 302).

Figure 8:
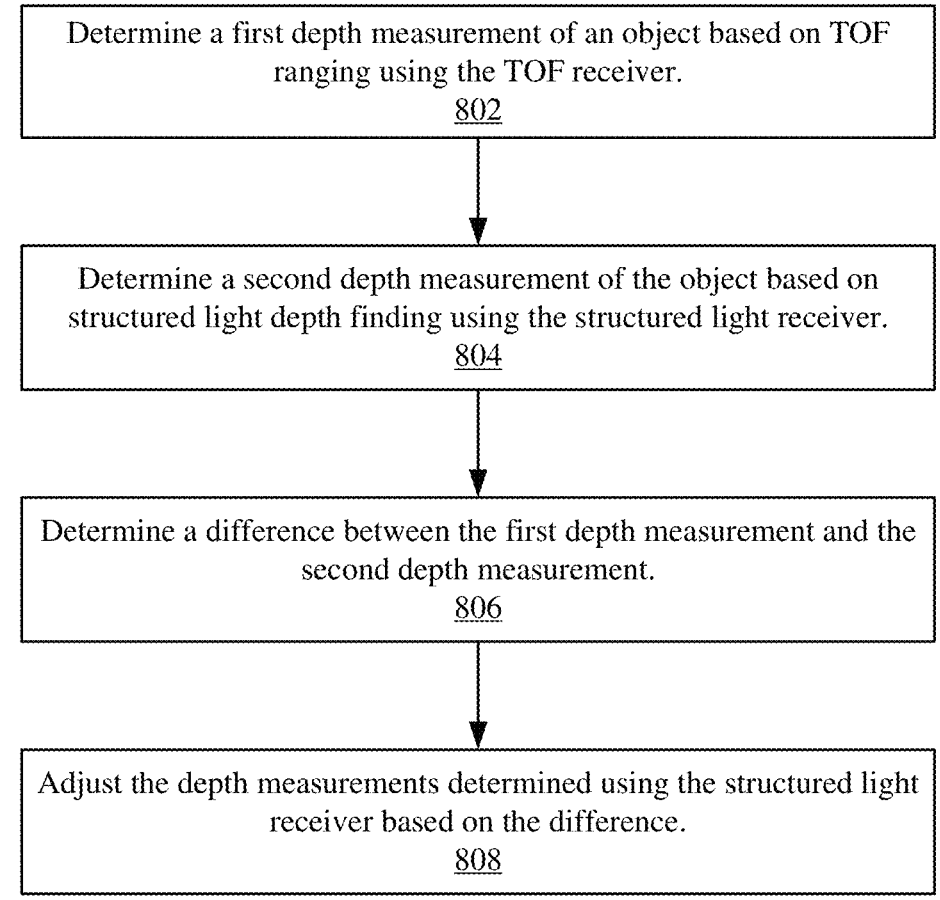
FIG. 8 is a flow chart depicting an example operation for calibrating a structured light receiver based on TOF measurements.

FIG. 8 is a flow chart depicting an example operation 800 for calibrating a structured light receiver (such as receiver 302 of FIG. 3) based on TOF measurements. Beginning at 802, the device 300 of FIG. 3 may determine a depth measurement of an object from the device 300 based on TOF ranging using the TOF receiver 305 of FIG. 3. For example, the device 300 may sense the light pulses of reflections of the transmitted light in the zero order portion of the spatial pattern from the transmitter 301 of FIG. 3. The sensed pulses may then be used to determine a first depth measurement of the object.

The device 300 may also determine a second depth measurement of the object based on structured light depth finding using the structured light receiver 302 (804). For example, the device 300 may identify the codeword corresponding to the zero order portion of the spatial pattern in reflections sensed by the structured light receiver 302, and the device 300 determines the second depth measurement of the object based on the identified codeword.

After determining the first depth and the second depth measurements, the device 300 may determine a difference between the first depth measurement and the second depth measurement (806). Assuming that the first depth measurement is accurate (and not as prone to error from component movement), the device 300 may determine that the error of the second depth measurement corresponds to the difference. The device 300 may then adjust the depth measurements determined using the structured light receiver 302 based on the difference (808). For example, the device 300 may add or subtract the difference from each depth measurement determining using the structured light receiver. In some example implementations, the depth measurements may correspond to any identified codeword in the spatial pattern (not just the codeword corresponding to the zero order portion of the spatial pattern).

Alternatively to compensate for errors by structured light depth sensing, the device 300 may determine the correct displacement and/or distortion of the codewords identified in the reflections based on the depth measurement using TOF ranging, and the device 300 may adjust the measured distortion and displacement to correct the depth measurements using structured light depth sensing.

In some example implementations, the device 300 may determine a difference periodically up to for each frame capture of the structured light receiver 302. In this manner, the device 300 may calibrate the structured light receiver in real-time and/or at any frequency.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software (such as a device altering the spatial pattern for an included structured light system), the techniques may be realized at least in part by a non-transitory processor-readable storage medium (such as the memory 306 in the example device 300 of FIG. 3) comprising instructions 308 that, when executed by the processor 304 (or the controller 310 or the signal processor 312), cause the device 300 or the depth finding system to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 304 or the signal processor 312 in the example device 300 of FIG. 3. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the examples for the depth finding system are described regarding light emissions or NIR emissions, signals at other frequencies may be used, such as microwaves, radio frequency signals, sound signals, and so on. Additionally, the functions, steps or actions of the method claims in accordance with aspects described herein need not be performed in any particular order unless expressly stated otherwise. For example, the steps of the described example operations, if performed by the device 300, the controller 310, the processor 304, and/or the signal processor 312, may be performed in any order. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A depth finding system, comprising:
a time-of-flight (TOF) receiver configured to sense pulses from reflections of light from a structured light transmitter, the light from the structured light transmitter including a spatial pattern of light points, wherein at least a portion of the spatial pattern of light points includes pulsed light points; and a controller configured to:
  determine information associated with the sensed pulses; and
  determine, based on the information, a round trip time of the sensed pulses.

2. The depth finding system of claim 1, wherein the controller is configured to:
  determine a depth of an object from the TOF receiver based on the round trip time of the sensed pulses.

3. The depth finding system of claim 1, further comprising the structured light transmitter to transmit the spatial pattern of light points.

4. The depth finding system of claim 3, further comprising a structured light receiver configured to sense reflections of the spatial pattern of light points, wherein the controller is further configured to identify one or more portions of the spatial pattern in the sensed reflections from the structured light receiver.

5. The depth finding system of claim 4, wherein the controller is further configured to control the pulses to prevent the structured light receiver from sensing the pulses.

6. The depth finding system of claim 4, wherein the TOF receiver includes a photodiode.

7. The depth finding system of claim 6, wherein the photodiode is an avalanche photodiode.

8. The depth finding system of claim 6, wherein the photodiode is configured to sense pulses from reflections of light for a zero order portion of the spatial pattern of light points.

9. The depth finding system of claim 4, wherein the controller is further configured to calibrate the structured light receiver based on the sensed pulses from the TOF receiver.

10. The depth finding system of claim 4, wherein the controller is further configured to determine a depth of an object using the structured light receiver when the object is in a first range of depths from the depth finding system, and further configured to determine the depth of the object using the TOF receiver when the object is in a second range of depths, wherein the second range is higher than the first range.

11. A method for determining one or more depths, comprising:
  sensing, by a time-of-flight (TOF) receiver, pulses from reflections of light from a structured light transmitter, the light from the structured light transmitter including a spatial pattern of light points, wherein at least a portion of the spatial pattern of light points includes pulsed light points;
  determining information associated with the sensed pulses; and
  determining, based on the information, a round trip time of the sensed pulses.

12. The method of claim 11, further comprising determining a depth of an object from the TOF receiver based on the round trip time of the sensed pulses.

13. The method of claim 11, further comprising transmitting, by the structured light transmitter, the spatial pattern of light points.

14. The method of claim 13, further comprising:
  sensing, by a structured light receiver, reflections of the spatial pattern of light points; and
  identifying one or more portions of the spatial pattern in the sensed reflections from the structured light receiver.

15. The method of claim 14, further comprising controlling the pulses to prevent the structured light receiver from sensing the pulses.

16. The method of claim 14, wherein sensing pulses from reflections includes sensing pulses from reflections of light for a zero order portion of the spatial pattern of light points.

17. The method of claim 14, further comprising calibrating the structured light receiver based on the sensed pulses from the TOF receiver.

18. The method of claim 14, further comprising:
  determining a depth of an object using the structured light receiver when the object is in a first range of depths; and
  determining the depth of the object using the TOF receiver when the object is in a second range of depths, wherein the second range is higher than the first range.

19. A non-transitory computer-readable medium storing one or more programs containing instructions that, when executed by one or more processors of a device, cause the device to determine one or more depths by performing operations comprising:
  sensing, by a TOF receiver, pulses from reflections of light from a structured light transmitter, the light from the structured light transmitter including a spatial pattern of light points, wherein at least a portion of the spatial pattern of light points includes pulsed light points;
  determining information associated with the sensed pulses; and
  determining, based on the information, a round trip time of the sensed pulses.

20. The non-transitory computer-readable medium of claim 19, wherein execution of the instructions causes the device to perform operations further comprising:
  determining a depth of an object from the TOF receiver based on the round trip time of the sensed pulses.

21. The non-transitory computer-readable medium of claim 19, wherein execution of the instructions causes the device to perform operations further comprising:
  transmitting, using the structured light transmitter, the spatial pattern of light points.

22. The non-transitory computer-readable medium of claim 21, wherein execution of the instructions causes the device to perform operations further comprising:
  sensing, by a structured light receiver, reflections of the spatial pattern of light points; and
  identifying one or more portions of the spatial pattern in the sensed reflections from the structured light receiver.

23. The non-transitory computer-readable medium of claim 22, wherein execution of the instructions causes the device to perform operations further comprising:
  controlling the pulses to prevent the structured light receiver from sensing the pulses.

24. The non-transitory computer-readable medium of claim 22, wherein execution of the instructions causes the device to perform operations further comprising:
  sensing pulses from reflections of light for a zero order portion of the spatial pattern of light points.

25. The non-transitory computer-readable medium of claim 22, wherein execution of the instructions causes the device to perform operations further comprising:
  calibrating the structured light receiver based on the sensed pulses from the TOF receiver.

26. The non-transitory computer-readable medium of claim 22, wherein execution of the instructions causes the device to perform operations further comprising:

determining a depth of an object using the structured light receiver when the object is in a first range of depths; and determining the depth of the object using the TOF receiver when the object is in a second range of depths, wherein the second range is higher than the first range.

27. A device for determining one or more depths, comprising:

means for transmitting a spatial pattern of light points, at least a portion of the spatial pattern of light points including pulsed light points;

means for sensing reflections of the spatial pattern of light points;

means for sensing pulses from reflections of at least the portion of the spatial pattern of light points including the pulsed light points, wherein the means for sensing pulses is separate from the means for sensing reflections of the spatial pattern; and means for determining, based on information associated with the sensed pulses, a round trip time of the sensed pulses.

28. The device of claim 27, further comprising:

means for identifying one or more portions of the spatial pattern in the sensed reflections of the pulsed light in the spatial pattern.

29. The device of claim 27, further comprising means for controlling the pulses to prevent sensing the pulses by the means for sensing the pulsed light in the spatial pattern.

30. The device of claim 27, further comprising means for sensing pulses from reflections of light for a zero order portion of the spatial pattern.

* * * * *